(12) United States Patent
Goergen et al.

(10) Patent No.: US 12,347,089 B2
(45) Date of Patent: Jul. 1, 2025

(54) HEAD-MOUNTED DISPLAY TESTING SYSTEM AND METHOD

(71) Applicant: Universal City Studios LLC, Universal City, CA (US)

(72) Inventors: Patrick John Goergen, Orlando, FL (US); Robert Michael Jordan, Orlando, FL (US); Eric To Chan, Lakeland, FL (US)

(73) Assignee: Universal City Studios LLC, Universal City, CA (US)

( * ) Notice: Subject to any disclaimer, the term of this patent is extended or adjusted under 35 U.S.C. 154(b) by 121 days.

(21) Appl. No.: 18/171,546

(22) Filed: Feb. 20, 2023

(65) Prior Publication Data
US 2023/0267590 A1 Aug. 24, 2023

Related U.S. Application Data (60) Provisional application No. 63/312,491, filed on Feb. 22, 2022.

(51) Int. Cl.
*G06T 7/00* (2017.01)
*A63G 31/16* (2006.01)
*H04N 23/54* (2023.01)

(52) U.S. Cl.
CPC ............ *G06T 7/0002* (2013.01); *A63G 31/16* (2013.01); *H04N 23/54* (2023.01); *G06T 2207/30204* (2013.01)

(58) Field of Classification Search
None
See application file for complete search history.

(56) References Cited

U.S. PATENT DOCUMENTS

| 9,796,089 | B2 | 10/2017 | Lawrence, III et al. | |
|---|---|---|---|---|
| 10,178,379 | B2 | 1/2019 | Wang et al. | |
| 10,869,144 | B2 | 12/2020 | Darlington et al. | |
| 2015/0035954 | A1 | 2/2015 | Hoffman et al. | |
| 2016/0203642 | A1* | 7/2016 | Thomas | G06T 19/006 345/8 |
| 2017/0252658 | A1* | 9/2017 | Reveley | A63G 31/16 |
| 2019/0004598 | A1* | 1/2019 | Gordt | A63G 7/00 |
| 2020/0215687 | A1 | 7/2020 | Graham et al. | |
| 2021/0004079 | A1 | 1/2021 | Reutter et al. | |

FOREIGN PATENT DOCUMENTS

EP 3115873 A1 1/2017

OTHER PUBLICATIONS

PCT/US2023/013540 International Search Report and Written Opinion mailed May 3, 2023.

* cited by examiner

Primary Examiner — Rebecca A Volentine
(74) Attorney, Agent, or Firm — Fletcher Yoder, PC (57) ABSTRACT

A head-mounted display testing system may include a ride motion simulator to simulate a movement of an amusement ride and a head-mounted display mounted on the ride motion simulator that displays a virtual image. The ride motion simulator includes one or more outward facing cameras configured to capture the virtual image and a physical marker when the head-mounted display is on the ride motion simulator. The controller is configured to receive the footage of the head-mounted display screen captured by the one or more cameras and to generate an indication of head-mounted display quality based on deviations from an expected display.

21 Claims, 4 Drawing Sheets

HEAD-MOUNTED DISPLAY TESTING SYSTEM AND METHOD

CROSS-REFERENCE TO RELATED APPLICATIONS

This application claims priority to and the benefit of U.S. Provisional Application No. 63/312,491, entitled "HEAD-MOUNTED STEREOSCOPIC DISPLAY TESTING SYSTEM AND METHOD," filed Feb. 22, 2022, which is hereby incorporated by reference in its entirety for all purposes.

BACKGROUND

The present disclosure relates generally to the field of amusement park entertainment. More specifically, embodiments of the present disclosure relate to a system to test the durability of head-mounted augmented reality/virtual reality displays worn during amusement rides.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Amusement parks and/or theme parks are designed to provide entertainment to guests. Areas of the amusement park may have different themes that are specifically targeted to certain audiences. For example, some areas may include themes that are traditionally of interest to children, while other areas may include themes that are traditionally of interest to more mature audiences. Generally, such areas having themes may be referred to as an attraction or a themed attraction. It is recognized that it may be desirable to enhance the immersive experience for guests in such attractions, such as by augmenting the themes with virtual features. Such virtual features can be provided to the guests via augmented reality (AR)/virtual reality (VR) head-mounted displays.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a head-mounted display testing system includes a mount configured to receive the head-mounted display that includes a display screen and at least one camera coupled to the mount and positioned to capture the display screen when the head-mounted display is on the mount. In addition, the head-mounted display testing system includes an actuator coupled to the mount and an actuator controller of the ride motion simulator, which drives motion of the actuator to cause the mount to simulate motion of a ride according to a motion pattern. The head-mounted display testing system also includes a controller, which receives a signal from the at least one camera comprising captured images of the display screen of the head-mounted display and identifies deviations from an expected display on the display screen based on the signal.

In one embodiment, a method of testing the head-mounted displays includes receiving an indication that head-mounted display is on ride motion simulator, controlling the ride motion simulator to move according to a ride motion pattern, and detecting a display screen on the head-mounted display using at least one camera of the ride motion simulator during movement in the ride motion pattern. In addition, the method of testing the head-mounted displays includes identifying deviations from an expected display on the display screen based on the signal received from the at least one camera and generating an indication of head-mounted display quality based on the identified deviations.

In one embodiment, the method of testing head-mounted displays comprising includes receiving an indication that head-mounted display is on ride motion simulator, controlling the ride motion simulator to move according to a ride motion pattern, detecting a display screen on the head-mounted display using at least one camera of the ride motion simulator during movement in the ride motion pattern. In addition, the method of testing the head-mounted displays includes identifying, while the ride motion simulator is moving, deviations from an expected display on the display screen based on the signal received from the at least one camera and generating a time of failure for the head-mounted display responsive to identifying the deviations.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

An amusement park may include an augmented reality (AR), a virtual reality (VR), and/or a mixed reality (a combination of AR and VR) system (e.g., AR/VR system) to enhance a guest experience of an amusement park attraction by providing guests with AR/VR experiences (e.g., AR experiences, VR experiences, or both). For example, the AR/VR system may include a head-mounted display (e.g., electronic goggles or displays, eyeglasses), which may be worn by a guest to enable the guest to view virtual or augmented reality features. In particular, the head-mounted display may be utilized to enhance a guest experience by overlaying virtual features onto a real-world environment of the amusement park, by providing adjustable virtual environments to provide different experiences in an attraction, and so forth. In some cases, head-mounted displays are provided to guests and returned after each ride cycle to be used by the next guest. Thus, each individual head-mounted display experiences normal wear and tear from heavy, repeated use as well as specific stresses that are associated with the motion pattern of the associated amusement ride. For example, as guests turn their heads or lean based on the motion of the ride vehicle during the course of the ride, a cable connecting the head-mounted display to the ride vehicle may experience stretching, compression, or other mechanical stresses. Because this cable transfers data to the head-mounted display, repeated cable stresses may lead to a deterioration in the operation of the head-mounted display over time.

The disclosed embodiments provide a head-mounted display testing system to monitor head-mounted display operation to assess a relationship between ride motion and eventual malfunction of the head-mounted display (e.g., the image displayed by the head-mounted display screen is invisible, blurry, interrupted, or otherwise compromised) due to use in high-motion environments such as an amusement ride. In particular, the head-mounted display testing system may include a ride motion simulator that includes an actuator and a robotic arm attached to a mount. The mount receives and retains the head-mounted display during testing. In an embodiment, the mount may be generally sized and shaped to resemble a human head. For example, the mount may be a three-dimensionally (3D) printed humanoid mannequin head. The head-mounted display may thus be retained on the ride motion simulator via the mount. The actuator controller may receive instructions to actuate the mount based on the motion pattern of an amusement ride. The controller of the ride motion simulator may then drive the robotic arm and an actuator according to the ride motion pattern, thus simulating the amusement ride.

The mount of the ride motion simulator may include one or more sensors, such as outward-facing cameras, that can be generally positioned as eyes on a face. Thus, when the head-mounted display is on the mount, the outward-facing cameras may capture (e.g., record, photograph) the active display screen of the head-mounted display. During the head-mounted display testing, the screen of the head-mounted display displays the desired images that are coordinated with ride motion of the amusement ride. The head-mounted display, in an embodiment, may also include a marker or fiducial that is captured by the one or more sensors to confirm that the head-mounted display remains securely mounted during testing.

During the head-mounted display testing and while the motion pattern is executed, the cameras capture the screen of the head-mounted display. A controller receives the information captured by the cameras, detects the displayed image, and determines an operational state of the head-mounted display based on correspondence or deviation of the displayed image from an expected display. For example, if the marker is detected but no displayed image is detected on the screen of the head-mounted display, this indicates that the screen of the head-mounted display may be broken or otherwise compromised. If neither the displayed image nor the marker is detected, the head-mounted display may have shifted or fallen off the mount. If the displayed images are detected but deviate from corresponding expected images (e.g., stored reference images), the head-mounted display can be flagged as nonoperational. Conversely, correspondence of the detected displayed images with expected images can be used to mark the head-mounted display as operating normally. Flagged head-mounted displays can be further evaluated to identify a failure mode and/or for maintenance or cable replacement.

This operational state may be used to determine parameters such as the average lifetime (e.g., number of ride cycles before image quality is compromised) of a head-mounted display in an amusement park environment. Further, by testing different ride motion patterns, particular patterns may be identified as being associated with shorter use lifespans. Thus, future amusement rides using head-mounted displays can be designed to include less disruptive motion patterns and to avoid motion patterns associated with head-mounted display malfunction and shorter lifespans.

Figure 1:
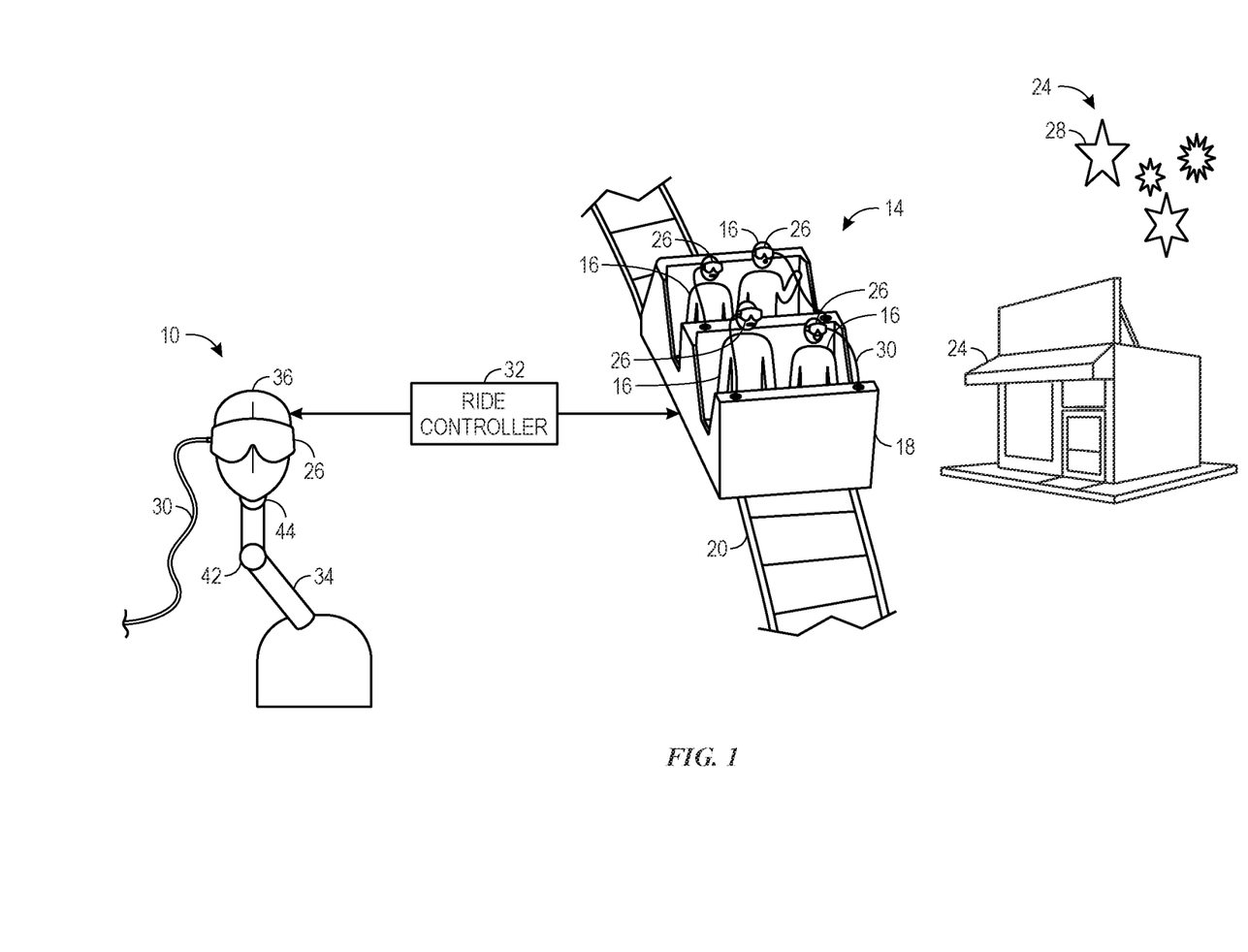
FIG. 1 is a head-mounted display testing system that includes a ride motion simulator that simulates motion of an amusement ride in which the head-mounted display may be utilized, in accordance with present embodiments.

With the foregoing in mind, FIG. 1 is a representation of the head-mounted display testing system 10. The head-mounted display testing system 10 includes a ride motion simulator 12. The ride motion simulator 12 receives ride motion pattern information to permit testing using a particular ride motion pattern. In an embodiment, the ride motion pattern executed by the system 10 is received from a ride controller 32 of an individual amusement ride 14 or is generated based on the predicted ride motion of the amusement ride caused by the ride controller 32.

The amusement ride 14 involves a ride vehicle 18 that travels along a ride path 20 causing the ride vehicle 18 to move according to a particular ride motion pattern. As shown in FIG. 1, passengers 16 are positioned within a ride vehicle 18. In an AR implementation, at least at certain times of the ride, the passengers 16 may be able to view physical structures 22 in the real-world environment 24 through the screens of the head-mounted displays 26 as well as displayed virtual features 28. As represented in the illustrated embodiment of FIG. 1, the virtual features 28 may be overlaid onto the real-world environment 24 so that the passengers 16 are able to view both the physical structures 22 in the real-world environment 24 and the virtual features 28 simultaneously. The head-mounted displays may, additionally or alternatively, be used in a fully immersive VR configuration in which the passengers 16 view the displayed images on the head-mounted displays 26 in an immersive manner and cannot view the real-world environment through lenses of the head-mounted display 26. However, it should be understood that the displayed images may include images of the physical structures 22 that are captured by cameras and, in turn provided as displayed images on the head-mounted displays 26. Each passenger 16 may be presented with different virtual features 28 so that each passenger 16 has a different experience on the ride 14 in an embodiment.

The ride vehicle 18 on the ride path 20 may drop, roll, pitch, and yaw so that the passengers 16 of the amusement ride 14 may experience ride forces. Such ride forces may help bring the head-mounted displays 26 to the end of their lifecycles faster than regular-use conditions (e.g., head-mounted display 26 being worn by a standing user or a walking user). For example, a cable 30, which may be tethered to the head-mounted display 26 at one end and to the ride vehicle 18 at another end, may have internal leads that fray or stretch faster due to rapid movement in response to the ride forces. The cable 30 connects the head-mounted display 26 to a controller, which is responsible for providing signals via the cable 30 to drive display of the virtual features 28. Thus, damage to the cable 30 may compromise the quality of the displayed images of the head-mounted display 26. For example, the virtual features 28 or images may become distorted or otherwise altered. In addition, the ride forces may cause the head-mounted display 26 to shift on the passenger's head such that the display screen is outside of the passenger's field of view. Alternatively, ride forces associated with the high motion environment may cause the head-mounted display to become dislodged or fall off the passenger's head during the ride.

The ride motion simulator 12 places the head-mounted display 26 in a high motion environment outside of an amusement ride 14. The ride motion simulator 12 includes a mount 36 that holds the head-mounted display 26 (e.g., via a guest interface device) as well as a robotic arm 34 and an actuator 44 that move the mount 36 according to the ride motion pattern of the ride controller 32. During the head-mounted display testing, the head-mounted display 26 is positioned on the mount 36, and the ride motion simulator 12 moves the mount 36 according to a motion pattern of the amusement ride 14.

In operation, the ride controller 32 may generate a ride control signal that guides the ride vehicle 18 along the ride path 20 according to the ride motion pattern. The ride controller 32 may drive the ride vehicle 18 according to one or more different motion patterns. Based on the ride control signal, the ride motion simulator 12 can simulate the movement (e.g., drop, pitch, yaw, roll) of the ride vehicle 18 and the passengers 16 during the amusement ride 14. In an embodiment, the ride control signal of the ride controller 32 is used to generate a simulation signal that translates the ride vehicle motion to predicted motion of a passenger's head within the ride vehicle 18. The simulation signal is them used to drive the ride motion simulator 12 to execute motion patterns. In an embodiment, the signal to drive the motion pattern may be provided to the controller of the ride motion simulator 12 directly from the ride controller 32 or from another source. Thus, the ride motion simulator 12 may execute the ride motion pattern to test the head-mounted display 26 under high-motion conditions that simulate the motion of the amusement ride 14.

Figure 2:
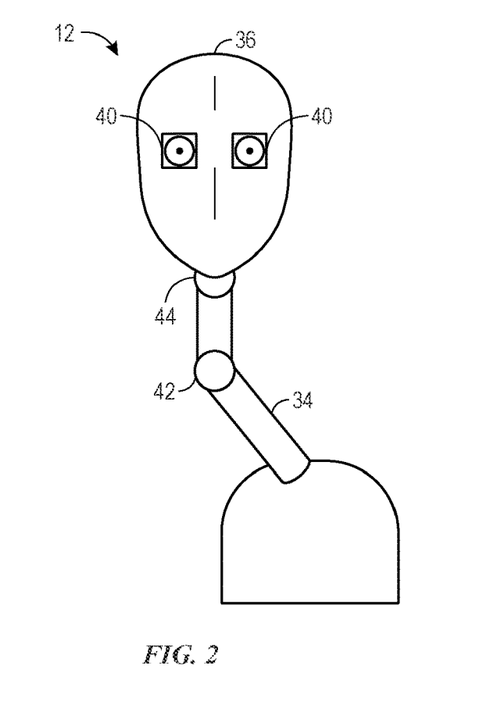
FIG. 2 is a perspective view of a ride motion simulator, in accordance with present embodiments.

FIG. 2 is a perspective view of components of the ride motion simulator 12. In the illustrated example, the ride motion simulator 12 does not have an associated head-mounted display 26. The ride motion simulator 12 includes a robot arm 34 connected to a mount 36. In some embodiments, the mount 36 may be implemented a three-dimensional (3D) humanoid mannequin head. The mount 36 may include one or more sensors, illustrated here as outward-facing cameras 40. The camera(s) 40 are generally positioned to correspond to the position of eyes on a face. However, it should be understood that other implementations are possible for the mount 36 that arrange the camera(s) 40 relative to the head-mounted display 26 with an appropriate spatial relationship.

In some embodiments, the robot arm 34 may include one or more joints 42 that increase the range of motion of the mount 36. Additionally, the robot arm 34 includes an actuator 44 coupled to the mount 36 and/or the robot arm 34. The movement of the actuator 44 and the robot arm 34 may allow the ride motion simulator 12 to replicate the motion of the head-mounted display 26 inside the ride vehicle 18 during the amusement ride 14.

Figure 3:
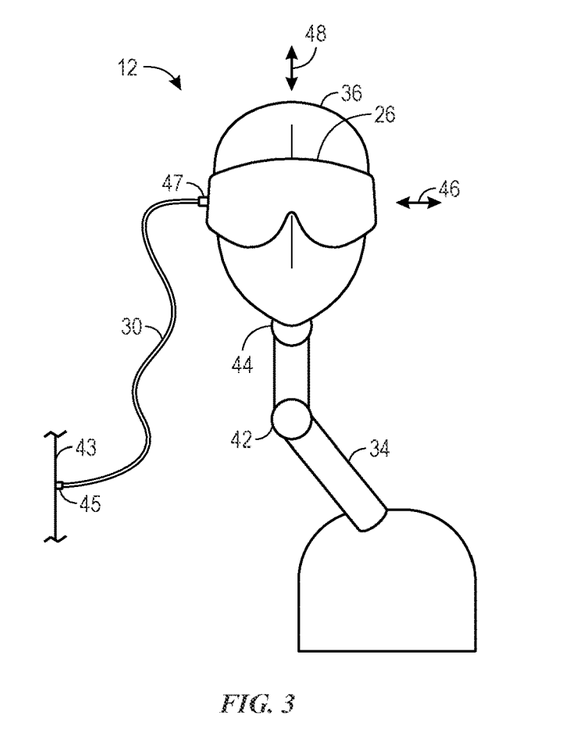
FIG. 3 is a perspective view of the ride motion simulator during the head-mounted display testing, in accordance with present embodiments.

FIG. 3 is a perspective view of the ride motion simulator 12. As shown in FIG. 3, when the head-mounted display 26 is mounted on the ride motion simulator 12, it rests on the mount 36 as a head-mounted display 26 may rest on the head of the passenger 16 of the ride vehicle 18 during the amusement ride 14 and/or to align the one or more cameras 40 with the display of the head-mounted display 26. Further, the cable 30 of the head-mounted display 26 is coupled to a fixed structure 43s at a first end 45 and to the head-mounted display 26 at a second end 47. To permit exchange of the head-mounted display 26 or the cable based on identified malfunction, the coupling at one or both the first end 45 or the second end 47 can be a reversible coupling. Images for display are provided to the head-mounted display 26 via the cable 30.

In certain embodiments, the head-mounted display 26 is a unitary assembly that includes display screens and a band, strap, or other feature that retains the head-mounted display 26 during use. In another embodiment, the head-mounted display 26 may be a two-part assembly including a display portion and a headband or head interface portion. The two parts of the assembly can be coupled and decoupled to one another. Thus, the head-mounted display 26 may be secured on the mount 36 using a guest interface device. The guest interface device is designed to enable the display portion of the head-mounted display 26 to quickly transition between being mounted onto the passenger's head and being taken off after the ride. The guest interface device is configured to be affixed to the passenger's head and, thus, enable the passenger to comfortably wear the head-mounted display 26 throughout various attractions or while traversing certain amusement park environments. For example, the guest interface device may include a head strap assembly that is configured to span about a circumference of the passenger's head and configured to be tightened (e.g., constricted) on the passenger's head. In this manner, the head strap assembly facilitates affixing the guest interface device to the head of the passenger, such that the guest interface device may be utilized to retain the head-mounted display 26 on the passenger. In a similar manner, the head strap assembly and the guest interface device may be used to affix the guest interface device to the mount 36.

Regardless of how the head-mounted display 26 is coupled the mount 36, when the head-mounted display 26 is operating, the display screen is in a field of view of the one or more outward-facing cameras 40 (see FIG. 2). During the head-mounted display testing, the mount 36 moves according to a motion pattern of the amusement ride 14. As mentioned earlier, in some embodiments, the robot arm 34 may also move about one or more joints 42 aiding the actuator 44 in executing the ride motion pattern. The resulting movement of the mount 36 in the lateral and vertical directions, shown by double-tipped arrows 46 and 48, allows the head-mounted display 26 to experience a high motion environment, as found during an amusement ride 14. The footage (e.g., images and/or videos displayed on the head-mounted display 26) captured (e.g., recorded, photographed) by the one or more cameras 40 during motion simulation are processed to identify image features associated with a decrease in functionality of the head-mounted display 26. Because the cable 30 is fixed at both ends, the simulated motion causes cable stress in a manner similar to that of the actual amusement ride. Thus, the effect of motion on cable integrity can be assessed. That is, because the cable 30 provides images for display, a decrease in image quality may be tied to motion-induced cable damage.

Figure 4:
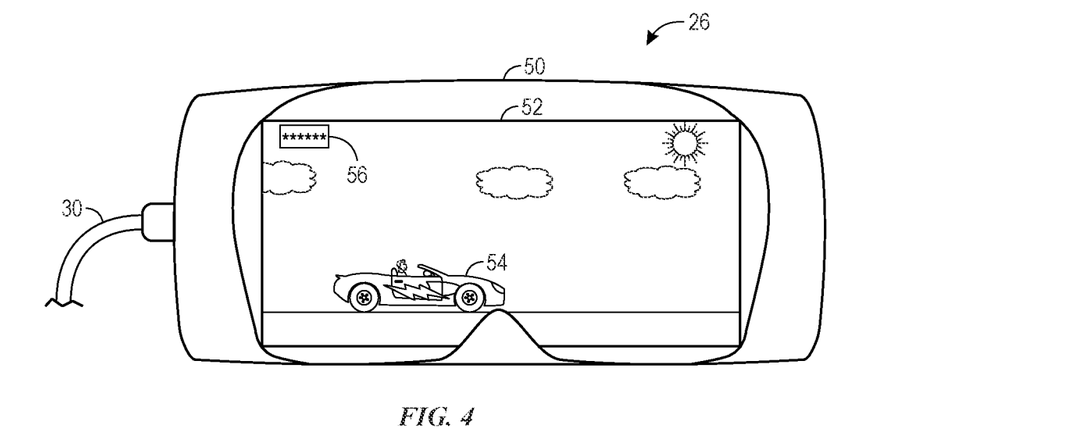
FIG. 4 is a perspective view of housing and screen of the head-mounted display featuring a displayed image and a marker, in accordance with present embodiments.

FIG. 4 is a perspective view of a housing 50 and the screen 52 of the head-mounted display 26 configured for head-mounted display testing. As mentioned earlier, the head-mounted display 26 includes a screen 52 that is coupled to a head-mounted display housing 50. The screen 52 may include one or more screens, lenses, or displays (e.g., transparent, semitransparent or opaque). By way of non-limiting example, the screen 52 may include transparent (e.g., see-through) light emitting diode (LED) displays or transparent (e.g., see-through) organic light emitting diode (OLED) displays. In some embodiments, the screen 52 may be formed from a single-piece construction that spans a certain distance so as to display images (e.g., virtual features 28) to both eyes of the user. That is, in such embodiments (e.g., the embodiment shown in FIG. 4), the screen 52 may be formed from a single, continuous piece of material, where the first screen, lens, or display may be aligned with a first eye of the user and the second screen, lens, or display may be aligned with a second eye of the user. In other embodiments, the screen 52 may be a multi-piece construction that is formed from two or more separate screens, lenses, or displays. In another embodiment, the screen 52 may be implemented as two separate screens, corresponding to a left-eye screen and a right eye screen.

During the head-mounted display testing, the screen 52 may display an image 54 (e.g., a virtual image), for example, an image of a car as in the illustrated embodiment. Additionally, a marker 56 (e.g., a physical marker) may be attached to the screen 52 and/or the housing 50 in a location that is in the view of the one or more cameras 40 but does not block the displayed image 54. In some embodiments, the marker can be a piece of a sticker, a printed marker, a fiducial marker, or the like. As mentioned earlier, the marker 56 may be used in conjunction with images captured by the camera(s) 40 to determine quality or operating state of the head-mounted display 26.

When the displayed image 54 is detected on the screen 52 during testing, the head-mounted display 26 is mounted and operating. However, if the displayed image 54 on the screen 52 is not detected, it may indicate the head-mounted display 26 is not working properly (e.g., due to cable damage) or the head-mounted display 26 is shifted or detached from the mount 36. The marker 56 may help differentiate between these two scenarios. If the displayed image 54 is not detected but the marker 56 is detected by the one or more cameras 40, then the head-mounted display 26 can be characterized as being nonfunctional while being affixed to the mount 36. On the other hand, if neither the displayed image 54 nor the marker 56 are detected by the one or more cameras 40, then the head-mounted display 26 may have detached from the mount 36 or otherwise shifted such that the screen 52 is no longer in the field of view of the one or more cameras 40.

Figure 5:
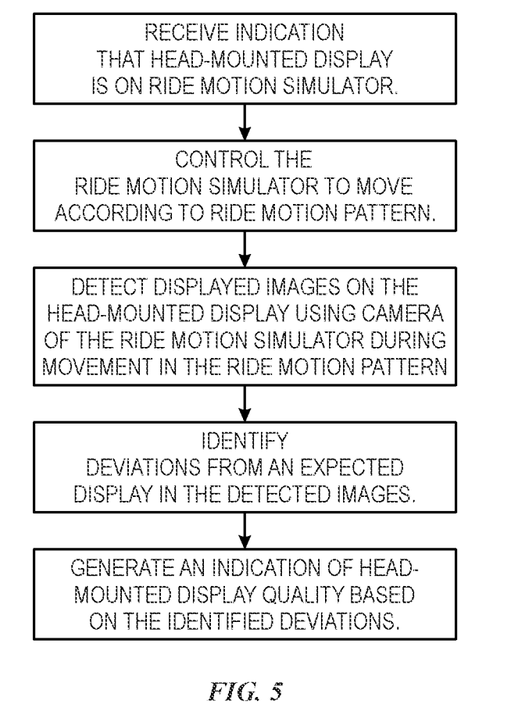
FIG. 5 is a flow chart of a process for testing the quality the head-mounted display, in accordance with present embodiments.

FIG. 5 is a flow chart of a process for ascertaining the quality of the head-mounted display 26, in accordance with present embodiments. The process begins with receiving an indication that the head-mounted display 26 is on ride motion simulator (block 62). As mentioned, this may involve the one or more cameras 40 capturing the marker 56 in their field of view and relaying the captured footage (e.g., images and/or video) to a processor, which executes instructions to process the camera footage (e.g., captured images) to detect a presence or absence of the marker 56 in the captured images. For example, an image recognition algorithm can be used to detect the marker 56 in camera's footage. The marker 56 may be selected to include an image or text that is not likely to be duplicated within the images displayed on the head-mounted display 26 to aid in identification of the marker 56.

Once the head-mounted display 26 has been mounted, the ride motion simulator is controlled to move according to the ride motion pattern (block 64). As mentioned earlier, the motion pattern may be selected from a variety of different motion patterns of an amusement ride 14. In addition, the motion pattern executed by the ride motion simulator may involve the movements 46, 48 that resemble or simulate the motions (e.g., drop, pitch, yaw, roll, etc.) of the ride vehicle 18 and its passengers 16 during an amusement ride 14. Furthermore, the motion pattern can be obtained from the amusement ride controller 32.

During the movement in the ride motion pattern, the images displayed on the head-mounted display screen 52 are detected using the one or more cameras 40 of the ride motion simulator (block 66). The images displayed on the head-mounted display 26 may include both the marker 56 and the displayed image 54.

After the images displayed on the head-mounted display are detected, deviations from an expected display in the detected images (e.g., displayed image 54 and marker 56) are identified (block 68). As mentioned earlier, possible deviations from the expected display may include absence of the displayed image 54, shifting of the displayed image 54 fully or partially outside the field of view of the one or more cameras 40, blurring or interruption of the displayed image 54, absence of the marker 56, and shifting of the marker 56 fully or partially outside the field of view of the one or more cameras 40. The deviations from an expected display may be detected, at a processor, by an image recognition algorithm. In an embodiment, the deviations may be detected by comparison with a signal provided to the head-mounted display 26 and intended to cause display of the images. The signal may be used as a reference image set, and the captured images can be compared to the reference images to identify any deviations.

In an embodiment, the comparison of the captured images to the reference images can be time-aligned, such that the comparison occurs between corresponding time points relative to the start of display (e.g., according to same time points of a video display). Further, the identification of deviations may be based on a frame-by-frame comparison.

The system can determine that an individual frame is different than its corresponding reference frame using image differencing techniques, e.g., pixel-by-pixel comparisons, to generate an image distance score between each compared set. The system 10 may extract the characteristics of each captured image and represent it as multi-dimensional feature vector. A distance measure D quantifies the similarity between the two images, where D is defined in the multi-dimensional feature space. As provided herein, the system 10 may use global or local similarity measures. In one embodiment, a global similarity value may be generated and, when outside of a predetermined range, the frame can be identified as having deviations from a reference image. When the global similarity value is within the predetermined range, the frame can be identified as conforming or having no deviations. Based on a total number if deviating frames, the operational state of the head-mounted display can be characterized. In an embodiment, the head-mounted display can be identified as operating normally or malfunctioning. When an individual frame is different than its time-aligned reference frame, the system 10 can start a counter of identified displayed and captured frames having deviation. When the counter reaches a threshold (e.g., at least 10 identified frames), the system 10 can flag the head-mounted display 26 as being in a malfunctioning operational state. Below the threshold, the head-mounted display 26 can be categorized as operating normally, and the system 10 can provide the appropriate indication.

After deviations from an expected display in the detected images have been identified, an indication of head-mounted display quality based on the identified deviations is generated (block 70). For example, if both the displayed image 54 and the marker 56 are detected by the at least one camera 40, then the indication of the head-mounted display quality may convey that the head-mounted display is operational. On the other hand, if the quality of the displayed image 54 has been compromised (e.g., disappearance, blurring, interruption of the displayed image 54) but the marker 56 is detected, then the indication of the head-mounted display quality may convey that the screen 52 of the head-mounted display 26 is malfunctioning (e.g., due to fraying of the cable 30). If the head-mounted display 26 is determined to be malfunctioning, the system 10 can generate a flag. In addition, if both the displayed image 54 and the marker 56 are not detected, then the indication may convey that the head-mounted display 26 may have shifted or detached from the mount 36.

The indications of the head-mounted display quality may be used to determine quantities like a mean time to failure of the head-mounted display. In one embodiment, the system 10 may test the head-mounted display 26 by repeating the motion pattern associated with an amusement ride over a number of cycles until a change in the operational state is detected. For example, the images displayed by the head-mounted display 26 may conform to an expected display (e.g., show high correspondence with the reference images) for cycles 1-1000 during testing. During subsequent cycles, the captured images of the one or more cameras 40 may show more deviations and less conformance with the reference images. If the deviations are greater than a threshold, the mean time to failure can be marked as being associated with the cycle number at which the deviations pass the threshold. Thus, the mean time to failure may be indicated by a number of ride cycles to failure in some embodiments. In other embodiments, the mean time to failure may be an overall testing time until failure.

It should be understood that the operating state of the head-mounted display can change over time and over the course of testing. Thus, the head-mounted display 26 may be characterized as operating normally at a first time point and in a malfunctioning operational state at a second, later, time point. The assessment of the operational state may be conducted in substantially real-time such that the system 10 flags malfunction as it occurs. Further, in an embodiment, the system 10 may instruct the ride motion simulator 12 to cease actuation upon identification of malfunction of the head-mounted display 26. In another embodiment, the assessment is done retroactively. In an embodiment, testing can occur using a predetermined number of ride cycle simulations (e.g., 500) to determine whether the head-mounted display 26 is sufficiently robust to operate normally over the predetermined number of cycles.

Further, the disclosed testing techniques may be used to test different motion patterns relative to one another. In an embodiment, certain motion patterns may have a faster time to failure relative to others. Such motion patterns can be flagged, and rides can be adjusted to change operating characteristics to avoid the flagged motion patterns and/or to include motion patterns with longer times to failure to preserve lifespan of head-mounted displays. Thus, the disclosed techniques can be used for design of amusement rides using head-mounted displays.

Figure 6:
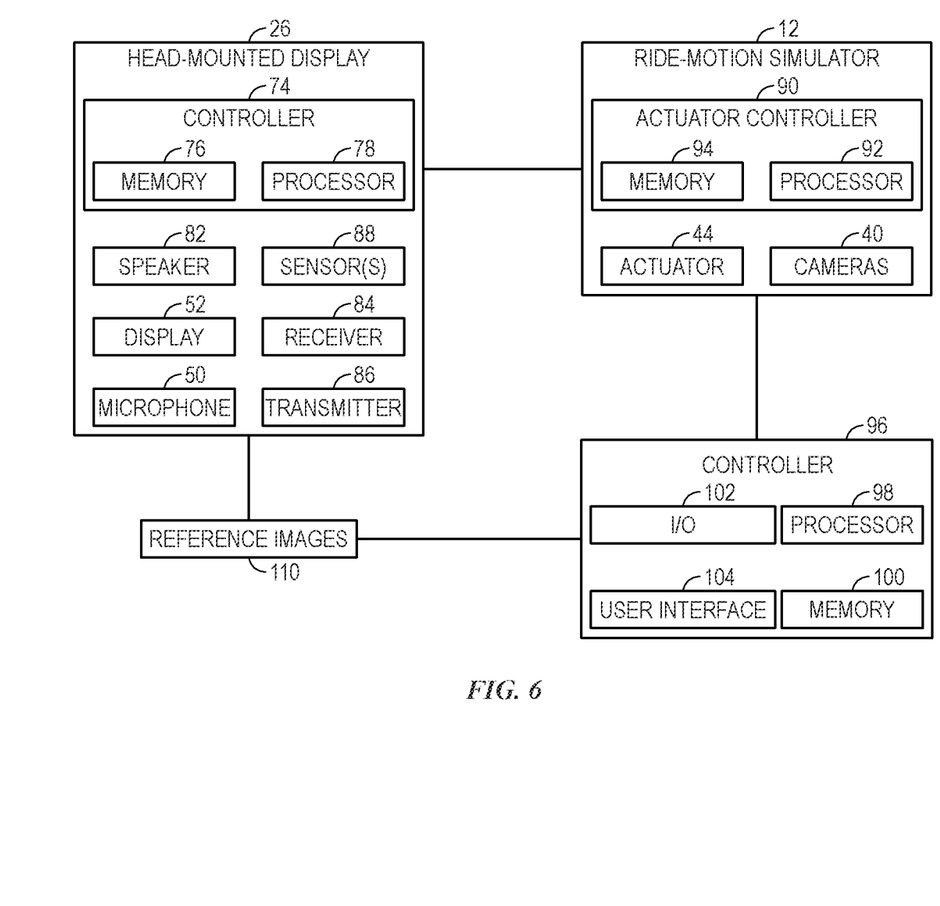
FIG. 6 is a block diagram of a head-mounted display testing system including a head-mounted display, a ride motion simulator and a controller, in accordance with present embodiments.

FIG. 6 is a block diagram of the head-mounted display testing system 10 that incorporates a head-mounted display 26, a ride motion simulator 12 and a controller 96, in accordance with present embodiments. The head-mounted display 26, the ride motion simulator 12, and the controller 96, may be separate components that are used together to test the head-mounted display quality.

As illustrated, the head-mounted display 26 may include a controller 74, for example, a central controller that includes one or more processors 78 and one or more memory devices 76. The one or more processors 78 may execute software programs and/or instructions to adjust displayed images, such as virtual features 28, displayed on the head-mounted display screen 52. Moreover, the processor(s) 78 may include multiple microprocessors, one or more "general-purpose" microprocessors, one or more special-purpose microprocessors, and/or one or more application specific integrated circuits (ASICS), and/or one or more reduced instruction set (RISC) processors. The memory device(s) 76 may include one or more storage devices, and may store machine-readable and/or processor-executable instructions (e.g., firmware or software) for the processor(s) 78 to execute, such as instructions relating to adjusting display of a virtual object. As such, the memory device(s) 76 may store, for example, control software, look up tables, configuration data, and so forth, to facilitate adjusting display of a virtual object. In some embodiments, the processor(s) 78 and the memory device(s) 76 may be external to the controller 74. The memory device(s) 76 may include a tangible, non-transitory, machine-readable-medium, such as a volatile memory (e.g., a random access memory (RAM)) and/or a nonvolatile memory (e.g., a read-only memory (ROM), flash memory, hard drive, and/or any other suitable optical, magnetic, or solid-state storage medium).

The head-mounted display 26 may include a microphone 80, a speaker 82, a receiver 84 and a transmitter 86. The receiver 84 picks up the audio output so that the wearer of the head-mounted display 26 can hear the audio through the speaker 82. The microphone 80 receives an audio input from the head-mounted display wearer, and the transmitter 86 transmits the audio input to other head-mounted display wearers. Additionally, the head-mounted display 26 may include a plurality of sensors 88 (e.g., a camera, eye tracking sensors, heart rate sensor, equipment monitoring sensors, hand tracking sensors, and the like).

As illustrated, the ride motion simulator 12 includes one or more cameras 40, an actuator 44 and an actuator controller 90, such as a central controller, which includes one or more processor(s) 92 and one or more memory device(s) 94. In some embodiments, the processor(s) 92 and the memory device(s) 94 may be external to the actuator controller 90.

The actuator controller 90 receives the ride motion pattern (e.g., from the ride controller 32) and drives motion of the actuator 44 to simulate motion of the amusement ride 14 according to a motion pattern. For example, the memory device(s) 94 may store machine-readable and/or processor executable instructions for the ride motion pattern execution. Meanwhile, the processor(s) 92 may execute software programs and/or instructions to direct the movement of the robotic arm 34 and the actuator 44 to move the mount 36 according to a motion pattern.

The controller 96 receives the footage captured by the camera(s) 40 for processing (e.g., image detection). The controller 96 includes processor(s) 98, memory device(s) 100, an input/output (I/O) port 102, and a user interface 104. The I/O port 102 may receive the footage from the camera(s) 40. The processor(s) 98 may execute software programs and/or instructions to receive the signal from the one or more camera(s) 40 and to identify deviations from an expected display on the display screen 52 based on the signal. For example, a processor 98 may run an image recognition algorithm to identify the displayed image 54 and the marker 56 on the display screen 52. The memory device(s) 100 may include one or more storage devices and may store machine-readable and/or processor-executable instructions (e.g., firmware or software) for the processor(s) 98 to execute, such as instructions relating to receiving camera signal and identifying deviations from an expected display. The controller 96 may thus generate an indication of the head-mounted display quality based on the identified deviations.

The user interface 104 (e.g., graphical user interface (GUI)) may be used to configure the controller 96 for processing the camera signal. For example, the user interface 104 may be used to set the expected display (e.g., expected image 54 and marker 56) so that deviations from the expected display can be identified in the detected images (e.g., detected image 54 and marker 56), as described in block 68. In another embodiment, the user interface 104 may be used to communicate the indication of the head-mounted display quality to the users. For example, the user interface 104 may display a notification indicating that the head-mounted display 26 is malfunctioning. In another embodiment, the user interface 104 may display a notification indicating that a head-mounted display 26 is on the ride motion simulator 12 prior to the beginning of the head-mounted display testing.

As discussed herein, the head-mounted display 26 can display images that are provided to the controller 74 of the head-mounted display 26 via the cable 30. These images may be provided as reference images 110 to the controller 96 and used to identify deviations. For example, the reference images 110 can be compared to the captured images from the camera(s) 40. If the head-mounted display is operating as intended, the images displayed on the display screen 52 of the head-mounted display 26 and captured by the camera(s) 40 should have high conformance to the reference images 110.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . ." or "step for [perform]ing [a function] . . .", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A head-mounted display testing system comprising:
   a mount configured to receive a head-mounted display, wherein the head-mounted display comprises a display screen;
   at least one camera coupled to the mount and positioned to capture the display screen when the head-mounted display is on the mount;
   an actuator coupled to the mount;
   an actuator controller configured to drive motion of the actuator to cause the mount to simulate motion of a ride according to a motion pattern;
   a feature associated with the head-mounted display and positioned in a field of view of the at least one camera when the head-mounted display is on the mount; and
   a controller configured to:
      receive captured images of the display screen of the head-mounted display from the at least one camera;
      identify deviations from an expected display on the display screen based on the captured images; and
      determine that the head-mounted display is secured to the mount based on identification of a presence of the feature in the captured images.

2. The system of claim 1, comprising the head-mounted display, wherein the display screen comprises a left eye display screen and a right eye display screen.

3. The system of claim 2, wherein the at least one camera comprises a left eye camera positioned to capture the left eye display screen and a right eye camera positioned to capture the right eye display screen.

4. The system of claim 1, wherein the mount comprises a humanoid mannequin head.

5. The system of claim 1, comprising a cable coupled to the head-mounted display at one end and to a fixed structure at another end.

6. The system of claim 1, wherein the controller is configured to generate an indication of a display quality of the head-mounted display based upon the deviations from the expected display on the display screen.

7. The system of claim 6, wherein the controller is configured to generate a notification when a change in the display quality is detected.

8. The system of claim 1, wherein the controller uses an image recognition algorithm and comparison of the captured images to reference images to identify deviations from the expected display.

9. The system of claim 1, comprising a robotic arm configured to move the mount according to the motion pattern.

10. The system of claim 1, wherein the actuator controller is configured to select the motion pattern from a plurality of motion patterns.

11. The system of claim 1, wherein the feature comprises a marker positioned on the head-mounted display.

12. The system of claim 11, wherein the marker comprises a sticker, a printed marker, a fiducial marker, or any combination thereof.

13. A method of testing head-mounted displays comprising:
- receiving an indication that head-mounted display is on ride motion simulator;
- controlling the ride motion simulator to move according to a ride motion pattern;
- capturing data from a display screen on the head-mounted display using at least one camera of the ride motion simulator during movement in the ride motion pattern;
- identifying deviations from an expected display on the display screen based on the data captured by the at least one camera; and
- generating a time of failure for the head-mounted display in response to identifying the deviations, wherein the time of failure is determined based on a number of repeated cycles of the ride motion pattern executed by the ride motion simulator an indication of head-mounted display quality based on the identified deviations.

14. The method of claim 13, comprising, generating a notification that the head-mounted display quality has changed based on the identified deviations.

15. The method of claim 13, comprising, generating a notification that the head-mounted display is improperly mounted based on a marker on the head-mounted display not being indicated by the data.

16. The method of claim 13, comprising comparing the data to reference image data to identify deviations from the expected display, wherein the reference image data is also provided to the head-mounted display to be displayed as associated imagery on the display screen.

17. The method of claim 16, wherein identifying deviations from the expected display on the display screen based on the data captured by the at least one camera comprises generating an image similarity value for one or more image frames in the data.

18. The method of claim 13, wherein the indication of the head-mounted display quality is associated with a malfunctional operating state of the head-mounted display and comprises controlling the ride motion simulator to stop moving upon identification of the malfunctional operating state.

19. The method of claim 13, wherein the data captured by the at least one camera comprises a marker positioned on the head-mounted display.

20. The method of claim 19, wherein the marker comprises a sticker, a printed marker, a fiducial marker, or any combination thereof.

21. A method of testing head-mounted displays comprising:
- receiving an indication that head-mounted display is on ride motion simulator;
- controlling the ride motion simulator to move according to a ride motion pattern;
- monitoring a display screen on the head-mounted display using at least one camera of the ride motion simulator during movement in the ride motion pattern;
- identifying, while the ride motion simulator is moving, deviations from an expected display on the display screen based on data captured by the at least one camera; and
- generating a time of failure for the head-mounted display in response to identifying the deviations, wherein the time of failure is determined based on a number of repeated cycles of the ride motion pattern executed by the ride motion simulator.

* * * * *